(12) United States Patent
Zhao

(10) Patent No.: US 8,445,580 B2
(45) Date of Patent: May 21, 2013

(54) TIRE WITH TREAD OF POLYBUTADIENE RUBBER

(75) Inventor: Junling Zhao, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/240,524

(22) Filed: Sep. 22, 2011

(65) Prior Publication Data

US 2012/0305153 A1    Dec. 6, 2012

Related U.S. Application Data

(63) Continuation-in-part of application No. 13/118,657, filed on May 31, 2011, now abandoned.

(51) Int. Cl.
*C08L 9/00* (2006.01)

(52) U.S. Cl.
USPC ........... 524/495; 524/343; 524/424; 524/502; 524/515; 524/543; 525/191; 525/232; 525/342; 525/343; 526/191; 526/192; 526/237

(58) Field of Classification Search
None
See application file for complete search history.

(56) References Cited

U.S. PATENT DOCUMENTS

| 5,567,784 | A | 10/1996 | Wieder et al. ................. 526/164 |
| 5,585,440 | A * | 12/1996 | Yamada et al. ............... 525/193 |
| 6,959,744 | B2 * | 11/2005 | Sandstrom et al. ........ 152/209.5 |
| 7,367,369 | B2 * | 5/2008 | Sandstrom et al. ........ 152/209.1 |
| 7,956,146 | B2 * | 6/2011 | Zhao et al. ................. 526/340.4 |
| 2011/0048605 | A1 * | 3/2011 | Zhang et al. .................. 152/525 |
| 2011/0077325 | A1 | 3/2011 | Luo .............................. 523/152 |
| 2011/0275751 | A1 * | 11/2011 | Costantini et al. ............ 524/432 |
| 2012/0053286 | A1 * | 3/2012 | Zhao et al. .................... 524/517 |

FOREIGN PATENT DOCUMENTS

| EP | 1640182 | 3/2006 |
| EP | 2221195 | 8/2010 |

OTHER PUBLICATIONS

"A Nd-carboxylate Catalyst for the Polymerization of 1,3-Butadiene: The Effect of Alkylaluminums and Alkylaluminum Chlorides" authored by Wilson and published in Journal of Polymer Science, Part A: Polymer Chemistry (1995) 33, 2505-2513.*
Internet article "Easy Processing NdBR", Lanxess Energizing Chemistry. Published at least as early as May 4, 2011.
European Search Report received by Applicant Aug. 27, 2012.

* cited by examiner

*Primary Examiner* — Marc Zimmer
(74) *Attorney, Agent, or Firm* — Henry C. Young, Jr.

(57) ABSTRACT

Pneumatic rubber tire intended for heavy duty service having a cap/base configured tread with a silica-containing specialized cis 1,4-polybutadiene rubber-rich tread cap rubber layer.

10 Claims, No Drawings

TIRE WITH TREAD OF POLYBUTADIENE RUBBER

This application is a continuation-in-part of prior U.S. patent application Ser. No. 13/118,657, filed May 31, 2011 now abandoned.

FIELD OF THE INVENTION

Pneumatic rubber tire intended for heavy duty service having a cap/base configured tread with a silica-containing specialized cis 1,4-polybutadiene rubber-rich tread cap rubber layer.

BACKGROUND OF THE INVENTION

Pneumatic rubber tires intended for heavy duty service (heavy duty rubber tires) conventionally have a tread with a cap/base layered construction where the outer rubber cap layer contains the running surface of the tread and where the tread cap rubber layer elastomer is comprised primarily of natural cis 1,4-polyisoprene rubber and are therefore natural rubber-rich. Such tire treads often have a small amount of cis 1,4-polybutadiene rubber to promote resistance to treadwear for the tire.

Polybutadiene rubber is generally not considered as being suitable as a primary elastomer for heavy duty tire treads.

A challenge is therefore presented for evaluating whether a synthetic rubber, namely synthetic cis 1,4-polybutadiene rubber, may be used to replace a significant amount of natural rubber for such heavy duty tire treads and achieve a combination of suitable resistance to wear (abrasion resistance) with similar resistance to tear (tear resistance) for the tire tread rubber composition, which are desirable rubber composition properties for the heavy duty tread cap rubber layer and, also, with suitable processability of the uncured rubber composition for preparation of the tread. A specialized synthetic cis 1,4-polybutadiene rubber is evaluated for such purpose.

Such cis 1,4-polybutadiene rubber is considered herein to be specialized in a sense of differing from more conventional cis 1,4-polybutadiene elastomers.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

DISCLOSURE AND PRACTICE OF THE INVENTION

In accordance with this invention, a pneumatic rubber tire is provided having a circumferential rubber tread where said tread is a silica-containing specialized cis 1,4-polybutadiene rubber-rich rubber composition which contains less than 50 phr of cis 1,4-polyisoprene rubber (particularly natural cis 1,4-polyisoprene rubber) and comprised of, based on parts by weight per 100 parts by weight of the tread rubber (phr), (A) about 55 to about 85, alternately about 65 to about 80, phr of specialized cis 1,4-polybutadiene rubber, and (B) about 45 to about 15, alternately about 35 to about 20 phr of at least one additional diene-based elastomer including cis 1,4-polyisoprene rubber, preferably cis 1,4-polyisoprene rubber, wherein said specialized cis 1,4-polybutadiene rubber, has a microstructure comprised of about 96 to about 99 percent cis 1,4-isomeric units, a number average molecular weight (Mn) in a range of from about 150,000 to about 200,000 (a relatively low Mn for a cis 1,4-polybutadiene elastomer) and a heterogeneity index (Mw/Mn) in a range of from about 1.5/1 to about 2.1/1 (a relatively moderate heterogeneity index range illustrating a moderate disparity between its number average and weight average molecular weights), (B) about 40 to about 110, alternatively about 50 to about 80, phr of reinforcing filler wherein said reinforcing filler is a combination of rubber reinforcing carbon black and synthetic amorphous silica (precipitated silica) comprised of:

(1) about 20 to about 60, alternately about 20 to about 50, phr of rubber reinforcing carbon black, and (2) about 10 to about 80, alternately about 20 to about 50, phr of precipitated silica; and (C) coupling agent (for said precipitated silica) having a moiety reactive with hydroxyl groups (e.g. silanol groups) on said precipitated silica and another different moiety interactive with carbon-to-carbon double bonds of said cis 1,4-polybutadiene rubber.

A significant aspect of this invention is providing said tire tread of a rubber composition having its rubber component provided as a said silica-containing specialized cis 1,4-polybutadiene rubber-rich composition.

This is considered herein to be significant in a sense that such practice is a departure from most past practices for a heavy duty tire tread of which its elastomer would otherwise be primarily composed of natural cis 1,4-polyisoprene rubber.

In one embodiment of the invention, for the reinforcing filler, said rubber reinforcing carbon black is a relatively small particle sized, high structure, rubber reinforcing carbon black having an Iodine adsorption value (ASTM D1510) in a range of about 110 to about 145 g/kg, which is indicative of a relatively small sized carbon black together with a dibutylphthalate (DBP) value (ASTM D2414) in a range of about 110 to about 140, cc/100 g, which is indicative of a high structure carbon black. Representative of such small sized, high structure, rubber reinforcing carbon blacks are, for example, ASTM designated rubber reinforcing carbon blacks as exemplary N121 and N205 carbon blacks. Examples of various rubber reinforcing carbon blacks together with their Iodine number values and DBP values, may be found in *The Vanderbilt Rubber Handbook*, (1990), 13th edition, Pages 416 through 419.

Use of the small sized, high structure, rubber reinforcing carbon black(s), with such Iodine adsorption value range and DBP value range, is considered herein to be important in order to promote good abrasion resistance, or coefficient of friction, and higher stiffness for the tire tread to promote cornering and handling of the tire, and also enhanced, or relatively high hysteresis and better tear resistance which are desirable properties for the tread rubber composition of this invention.

In practice, said coupling agent may be comprised of a bis(3-trialkoxysilylalkyl)polysulfide having an average of from 2 to 4, alternately an average of from about 2 to about 2.6 or an average of from about 3.4 to about 3.8, connecting sulfur atoms in its polysulfidic bridge or comprised of an alkoxyorganomercaptosilane. Such coupling agents are well known to those having skill in such art.

In practice, it is envisioned that the specialized polybutadiene elastomer may be a neodymium catalyst prepared polybutadiene prepared, for example, by polymerization of 1,3-polybutadiene monomer in an organic solvent solution in the presence of a catalyst system comprised of neodymium compound, an aluminum alkyl and an aluminum chloride delivering compound, and where the polybutadiene polymer might be coupled, for example, by treating the reaction mixture with, for example, a sulfur chloride such as, for example, disulfur dichloride as mentioned in U.S. Pat. No. 5,567,784, so long as it possesses the aforesaid microstructure, molecular weight and heterogeneity index. Representative of neodymium compounds might be, for example, neodymium neodecanoate, neodymium octanoate or neodymium versalate. The neodymium compounds might be derived from a neodymium carboxylate soap such as, for example $Nd(R-COO)_3$. Representative of aluminum alkyl compounds may be, for example, triisobutylaluminum (TIBA) and diisobutylaluminum hydride (DIBAH). Representative of aluminum chloride delivering compounds may be, for example, diethylaluminum chloride, all so long as the specialized polybutadiene elastomer possesses the aforesaid microstructure, molecular weight and heterogeneity index and Tg ranges.

Therefore, the catalyst for preparation of said specialized polybutadiene elastomer is exclusive of titanium, cobalt or nickel based catalysts used for preparation of cis 1,4-polybutadiene elastomers.

For this evaluation, a purpose of inclusion of the specialized polybutadiene with its relatively high number average molecular weight, relative low homogeneity index and somewhat low Tg is to promote higher rebound values for the rubber composition which is predictive of less internal heat generation, and therefore less temperature build-up for the rubber composition when it is being worked and predictive of better (lower) rolling resistance for a tire with a tread of such rubber composition which contains the specialized polybutadiene rubber. A further purpose is to promote greater abrasion resistance of the rubber composition which is predictive of better resistance to treadwear for a tire with such rubber composition which contains the specialized polybutadiene rubber.

Representative of said specialized cis 1,4-polybutadiene rubber for use in this invention is, for example, CB25™ Budene from Lanxess. While the technical aspect may not be fully understood, it is a feature of this invention that the specialized cis 1,4-polybutadiene rubber is differentiated from other cis 1,4-polybutadiene rubbers as being required to be the product of organic solvent solution polymerization of 1,3-butadiene monomer in the presence of a neodymium based catalyst instead of lithium, cobalt or nickel based polymerization catalysts.

The specialized cis 1,4-polybutadiene elastomer is believed to have a have a degree of branched configuration which is understood to promote processability in its unvulcanized state.

In the practice of this invention, use of specialized cis 1,4-polybutadiene rubber in a silica reinforcement-containing rubber composition, together with a coupling agent for the silica is considered herein to be important in order to optimize resistance to the rubber composition's abrasion (resistance to tread wear) and to promote a suitable hysteresis (e.g. reduced or acceptable rolling resistance for the tire) as well as suitable tear strength.

While this phenomenon may not be fully understood, it is envisioned that such aforesaid coupling and branching of the specialized polybutadiene may provide a significant contribution to promoting such processability of the uncured rubber composition and cured physical properties for a silica-rich, specialized polybutadiene-rich truck tire tread.

The precipitated silica for the reinforcing filler is a synthetic amorphous silica such as, for example, those obtained by the acidification of a soluble silicate (e.g., sodium silicate or a co-precipitation of a silicate and an aluminate). Such precipitated silicas are, in general, well known to those having skill in such art.

The BET surface area of the synthetic silica (precipitated silica), as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

Various commercially available synthetic silicas, particularly precipitated silicas, may be considered for use in this invention such as, for example, only and without limitation, silicas commercially available from PPG Industries under the Hi-Sil trademark with designations 210, 243, etc; silicas available from Rhodia, with designations of Zeosil 1165 MP and Zeosil 165GR and silicas available from Degussa AG with designations VN2 and VN3, 3770GR, and from Huber as Zeopol 8745.

The silica reinforcement for the rubber tire tread is used with a coupling agent.

The coupling agents cause the silica to have a reinforcing effect on the rubber, many of which are generally known to those skilled in such art. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of an alkoxy silane which has a constituent component, or moiety, (the alkoxy portion) capable of reacting with the silica surface (e.g. silanol groups on the silica surface) and, also, a constituent component, or moiety, capable of reacting with the rubber, particularly a sulfur vulcanizable rubber which contains carbon-to-carbon double bonds, or unsaturation. In this manner, then the coupling agent acts as a connecting bridge between the silica and the rubber and thereby enhances the rubber reinforcement aspect of the silica in a manner known to those having skill in such art.

Numerous coupling agents are taught for use in combining silica and rubber such as, for example, silane coupling agents containing a polysulfide component, or structure, such as bis-(3-alkoxysilylalkl)polysulfide which contains an average from 2 to about 4 (such as for example a range of from 2 to about 2.4 or a range of from 3 to about 4) connecting sulfur atoms in its polysulfidic bridge such as, for example, a bis-(3-triethoxysilylpropyl)polysulfide.

A usually desirable coupling agent is comprised of a bis-(3-ethoxysilylpropyl)polysulfide having from 2 to 4, with an average of from about 2 to 2.6, or an average of from about 3.4 to about 3.8, connecting sulfur atoms in the polysulfide bridge. Such coupling agent having an average of from about 2 to 2.6 connecting sulfur atoms in its polysulfidic bridge may be particularly desired in order to promote ease of processing, particularly mixing, the unvulcanized rubber composition.

For this invention, it is desired that the sulfur cured rubber composition for the tire tread primarily based upon the silica-containing specialized cis 1,4-polybutadiene rubber without being primarily based on the natural rubber has physical properties presented in the following Table A in order to be a suitable replacement of a significant portion of natural rubber with the silica-containing specialized butadiene based rubber rich heavy duty tire tread.

TABLE A

| | |
|---|---|
| Tear resistance, 95° C., of the cured rubber, (Newtons) of: | at least 150 |
| Dynamic storage modulus G', 100° C., of the uncured rubber (KPa) of: | less than 260 |
| Grosch abrasion rate (high severity), mg/km of the cured rubber of: | less than 200 |
| Heterogeneity index of the specialized cis 1,4-polybutadiene: | from 1.5/1 to about 2.1/1 |

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, fatty acid comprised of, for example, stearic, oleic, palmitic, and possibly linolenic, acids, zinc oxide, sulfur-contributing material(s) and vulcanization accelerator(s) as hereinbefore mentioned.

Processing aids may be used, for example, waxes such as microcrystalline and paraffinic waxes, in a range, for example, of about 1 to 5 phr or about 1 to about 3 phr; and resins, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art.

The invention may be better understood by reference to the following example in which the parts and percentages are by weight unless otherwise indicated.

EXAMPLE I

Rubber compositions were prepared to evaluate replacement of a significant amount of natural rubber (natural cis 1,4-polyisoprene) with the specialized cis 1,4-polybutadiene rubber in a tire tread.

Rubber compositions are referred in this Example as rubber Samples A and B.

Rubber Sample A is a Comparative Sample based on natural rubber.

Experimental rubber Sample B is an experimental rubber sample based on a specialized cis 1,4-polybutadiene rubber used with a minor amount of natural rubber.

The basic rubber composition formulation is shown in Table 1 and the ingredients are expressed in parts by weight per 100 parts rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then mixed in a second non-productive mixing stage (NP-2) in an internal rubber mixer for about 4 minutes to a temperature of about 160° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

TABLE 1

| | Parts (phr) |
|---|---|
| First Non-Productive Mixing Step (NP1) - Mixed to 160° C. | |
| Natural cis 1,4-polyisoprene rubber (SMR20) | 100 or 25 |
| Specialized cis 1,4-polybutadiene rubber[1] | 0 or 75 |
| Carbon black, rubber reinforcing (N121)[2] | 35 |
| Silica, precipitated[3] | 32 |
| Silica coupling agent[4] | 2.6 |
| Wax microcrystalline and paraffin | 1.5 |
| Fatty acid[5] | 2 |
| Antioxidants | 2.8 |
| Zinc oxide | 3 |
| Productive Mixing Step (PR) - Mixed to 110° C. | |
| Sulfur | 1.4 |
| Accelerator(s)[6] | 2 |

[1]Specialized cis 1,4-polybutadiene rubber (said organic solvent solution polymerized 1,3-butadiene monomer in the presence of a neodymium catalyst) as CB25 ™ from the Lanxess company having a Tg of about −105° C. and heterogeneity index in a range of from about 1.5/1 to about 2.2/1.
[2]Rubber reinforcing carbon black as N121, an ASTM designation
[3]Precipitated silica as Zeosil ™ Z1165 MP from the Rhodia Company
[4]Coupling agent comprised of bis(3-triethoxysilylpropyl) polysulfide having an average of from about 2 to about 2.6 connecting sulfur atoms as Si266 ™ from Evonik Degussa
[5]Mixture comprised of stearic, palmitic and oleic acids
[6]Sulfenamide and diphenyl guanidine sulfur cure accelerators The following Table 2 represents the uncured and cured behavior and various physical properties of the rubber compositions based upon the basic formulation of Table 1, and reported as rubber Samples A, B and C.

TABLE 2

| | Control | Experimental | |
|---|---|---|---|
| | A | B | C |
| Natural rubber—SMR-20 (phr) | 100 | 50 | 25 |
| Specialized cis 1,4-polybutadiene rubber (phr) | 0 | 50 | 75 |
| Properties | | | |
| RPA test | | | |
| Uncured dynamic storage modulus G' (KPa) At 10% strain, 11 Hertz, 100° C.; | 211 | 281 | 284 |
| Dynamic storage modulus G' (MPa) | 1.6 | 1.92 | 2.13 |
| Tan delta | 0.138 | 0.133 | 0.135 |

TABLE 2-continued

|  | Control | Experimental | |
|---|---|---|---|
|  | A | B | C |
| MDR test; 60 minutes at 150° C. | | | |
| Maximum torque (dN-m) | 18.6 | 21.9 | 24.1 |
| Minimum torque (dN-m) | 2.9 | 4 | 4.1 |
| T90 (minutes) | 7.25 | 7.88 | 8.33 |
| Stress-strain | | | |
| Tensile strength (MPa) | 22 | 20.7 | 18.7 |
| Elongation at break (%) | 522 | 550 | 515 |
| 100% modulus, ring, (MPa) | 1.88 | 1.9 | 2.02 |
| 300% modulus, ring, (MPa) | 12 | 9.98 | 9.88 |
| Rebound (Zwick) | | | |
| 23° C. | 47 | 52 | 52 |
| 100° C. | 62 | 63 | 62 |
| Shore A Hardness | | | |
| 23° C. | 66 | 67 | 70 |
| 100° C. | 60 | 62 | 65 |
| Tear Strength[1], N | | | |
| At 23° C. | 147 | 126 | 139 |
| At 95° C. | 238 | 142 | 139 |
| Abrasion rate (mg/km), Grosch[2] | | | |
| Low severity (20 N), 2° slip angle, disk speed = 40 km/hr, distance = 7,500 meters | 7.9 | 5 | 4 |
| Medium severity (40 N), 6° slip angle, disk Speed = 20 km/hr, distance = 1,000 meters | 67 | 48 | 33 |
| High severity (70 N), 12° slip angle, disk speed = 20 km/hr, distance = 250 meters | 770 | 375 | 203 |
| Ultra High severity (70 N), 16° slip angle, disk Speed = 20 km/hr, distance = 500 meters | 2512 | 965 | 351 |

[1]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.
[2]The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra high abrasion severity test may be run, for example, at a load of 70 Newtons, 16° slip angle, disk speed of 20 km/hr and distance of 500 meters.

Compared to the 100 phr natural rubber based composition of Control rubber Sample A, it can be seen from Table 2 that the abrasion rate of Experimental rubber Sample B, with a 50/50 ratio of the specialized cis 1,4-polybutadiene rubber to natural rubber, was reduced (improved) by at least 60 percent and by as much as 260 percent, depending upon the severity of the Grosch abrasion test.

Compared to the 100 phr natural rubber based composition of Control rubber Sample A, it can be seen from Table 2 that the abrasion rate of Experimental rubber Sample C, with a 75/25 ratio of the specialized cis 1,4-polybutadiene rubber to natural rubber, was reduced (improved) by at least 197 percent and by as much as 715 percent, depending upon the severity of the Grosch abrasion test.

Compared to the 100 phr natural rubber based composition of Control rubber Sample A, it can be seen from Table 2 that the stiffness as evidenced by the dynamic storage modulus G' of Experimental rubber Sample C, with a 75/25 ratio of the specialized cis 1,4-polybutadiene rubber to natural rubber, was increased (improved) from 211 MPa to 284 MPa.

Compared to the 100 phr natural rubber based composition of Control rubber Sample A, it can be seen from Table 2 that the Shore A hardness of Experimental rubber Sample C, with a 75/25 ratio of the specialized cis 1,4-polybutadiene rubber to natural rubber, was increased from 66 to 70 (23° C.) and from 60 to 65 (100° C.).

It is important to appreciate that, while the abrasion rate was significantly reduced and both the dynamic storage modulus G' and Shore A hardness were somewhat increased, the Rebound values at both 23° C. and 100° C. were largely unaffected.

This is discovery of achieving similar rebound values is considered herein to be significant in a sense of maintaining the hysteresis property of the rubber composition and therefore without significantly predicting an increase in internal heat build up for the tread by replacing most of the natural cis 1,4-polyisoprene rubber with the specialized polybutadiene rubber.

In particular, it is seen that abrasion resistance was significantly improved with somewhat similar tear strength which is considered herein beneficial to promote tire tread durability for a tire with tread of such rubber composition.

It is also observed that, for Rubber Sample C where, the elastomer is composed primarily of the specialized cis 1,4-polybutadiene rubber, the storage modulus (G') of the uncured rubber composition was not significantly increased which indicates that the processability of the rubber Samples were similar.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire is having a circumferential rubber tread of a cap/base configuration with an outer tread cap rubber layer with a running surface and an underlying tread base rubber layer, wherein the rubber composition of said outer tread cap rubber is comprised of, based on parts by weight per 100 parts by weight of the tread rubber (phr),
   (A) about 55 to about 85 phr of specialized cis 1,4-polybutadiene rubber, and
   (B) about 45 to about 15 phr of at least one additional diene-based elastomer including c is 1,4-polyisoprene rubber,
   wherein said specialized cis 1,4-polybutadiene rubber, has a microstructure comprised of about 96 to about 99 percent cis 1,4-isomeric units, a number average molecular weight (Mn) in a range of from about 150,000 to about 200,000 and a heterogeneity index (Mw/Mn) in a range of from about 1.5/1 to about 2.1/1,
   (B) about 40 to about 110 phr of reinforcing filler wherein said reinforcing filler is a combination of rubber reinforcing carbon black and synthetic amorphous silica (precipitated silica) comprised of:
      (1) about 20 to about 60 phr of rubber reinforcing carbon black, and
      (2) about 10 to about 80 phr of precipitated silica; and
   (C) coupling agent having a moiety reactive with hydroxyl groups on said precipitated silica and another different moiety interactive with carbon-to-carbon double bonds of said cis 1,4-polybutadiene rubber.

2. The tire of claim 1 wherein said rubber reinforcing carbon black has an Iodine adsorption value (ASTM D1510) in a range of about 110 to about 145 g/kg and a dibutylphthalate (DBP) value (ASTM D2414) in a range of about 110 to about 140, cc/100 g.

3. The tire of claim 1 wherein said coupling agent is comprised of a bis(3-trialkoxysilylalkyl)polysulfide having an average of from 2 to 4 connecting sulfur atoms in its polysulfidic bridge.

4. The tire of claim 1 wherein said coupling agent is comprised of a bis(3-triethoxysilylpropyl)polysulfide having an average of from about 2 to about 2.6 connecting sulfur atoms in its polysulfidic bridge.

5. The tire of claim 1 wherein said coupling agent is comprised of a bis(3-triethoxysilylpropyl)polysulfide having an average of from about 3.4 to about 3.8, connecting sulfur atoms in its polysulfidic bridge.

6. The tire of claim 1 wherein said coupling agent is comprised of an alkoxyorganomercaptosilane.

7. The tire of claim 1 wherein said specialized polybutadiene elastomer is a neodymium catalyst prepared polybutadiene prepared by polymerization of 1,3-polybutadiene monomer in an organic solvent solution in the presence of a catalyst system comprised of neodymium compound, an aluminum alkyl and an aluminum chloride delivering compound, and by coupling the polybutadiene by treating the reaction mixture with disulfur dichloride so long as the said specialized polybutadiene possesses the aforesaid microstructure, molecular weight and heterogeneity index.

8. The tire of claim 7 wherein said neodymium compound is comprised of neodymium neodecanoate, neodymium octanoate or neodymium versalate; the aluminum alkyl compound is comprised of triisobutylaluminum or diisobutylaluminum hydride and the aluminum chloride delivering compound is comprised of diethylaluminum chloride, so long as the specialized polybutadiene elastomer possesses the aforesaid microstructure, molecular weight and heterogeneity index and Tg ranges.

9. The tire of claim 7 wherein the catalyst for preparation of said specialized polybutadiene elastomer is exclusive of titanium, cobalt and nickel based catalysts.

10. The tire of claim 7 wherein said specialized polybutadiene contains branching promoted by treatment with said disulfur dichloride.

* * * * *